United States Patent [19]

Kent et al.

[11] Patent Number: 5,418,041
[45] Date of Patent: May 23, 1995

[54] METHOD OF APPLYING A CERAMIC IMAGE TO A COMPLEX CERAMIC ARTICLE

[75] Inventors: Raymond C. Kent; Terry N. Tice; William C. Welch, all of Lancaster, Pa.

[73] Assignee: Armstrong World Industries, Inc., Lancaster, Pa.

[21] Appl. No.: 120,695

[22] Filed: Sep. 10, 1993

Related U.S. Application Data

[63] Continuation-in-part of Ser. No. 885,350, May 19, 1992, abandoned.

[51] Int. Cl.⁶ .............................................. B32B 9/00
[52] U.S. Cl. .................................... 428/195; 428/38; 428/57; 428/426; 428/432; 428/688; 428/914; 156/230; 156/236; 156/384; 156/540
[58] Field of Search ................ 428/195, 688, 913.3, 428/57, 432, 38, 34, 426, 914; 427/261, 281; 156/384, 230, 236, 540

[56] References Cited

U.S. PATENT DOCUMENTS

| | | | |
|---|---|---|---|
| 3,967,021 | 6/1976 | Weingrad | 428/40 |
| 4,010,057 | 3/1977 | Nakanishi | 156/384 |
| 4,229,239 | 10/1980 | Arai et al. | 156/155 |
| 4,436,571 | 3/1984 | Nakanishi | 156/384 |
| 5,019,440 | 5/1991 | Ogasawara et al. | 428/195 |

FOREIGN PATENT DOCUMENTS 59-258802 12/1984 Japan.
59258802 6/1988 Japan.

*Primary Examiner*—Patrick J. Ryan
*Assistant Examiner*—Abraham Bahta

[57] ABSTRACT

A ceramic ink is transferred to complex ceramic articles by a modified transfer process which allows 20% or greater of the surface area of the ceramic article to be printed. To adhere the ceramic ink to the ceramic articles, the surface of the ceramic article is sprayed with a thin layer of oil. After transfer of the ink design, residual poly vinyl alcohol is washed off of the article while the printed image is held in place by the insoluble precoated oil. The finished ceramic article has a 100% ceramic finish that is very durable.

9 Claims, 3 Drawing Sheets

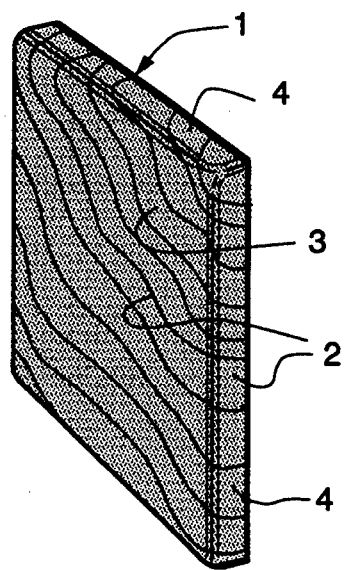
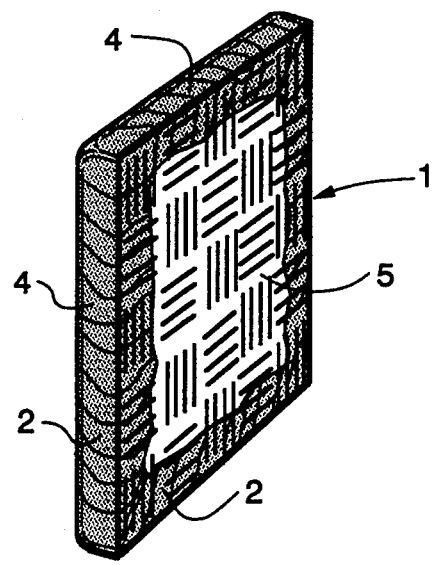
Fig. 1    Fig. 2
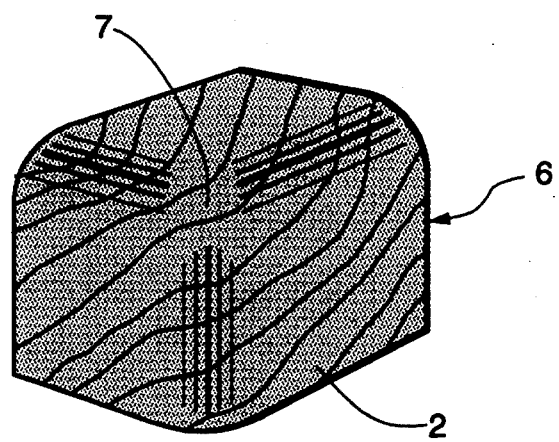
Fig. 3
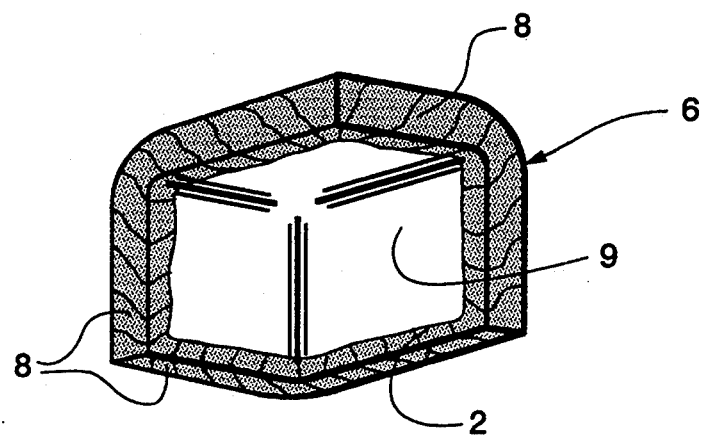
Fig. 4

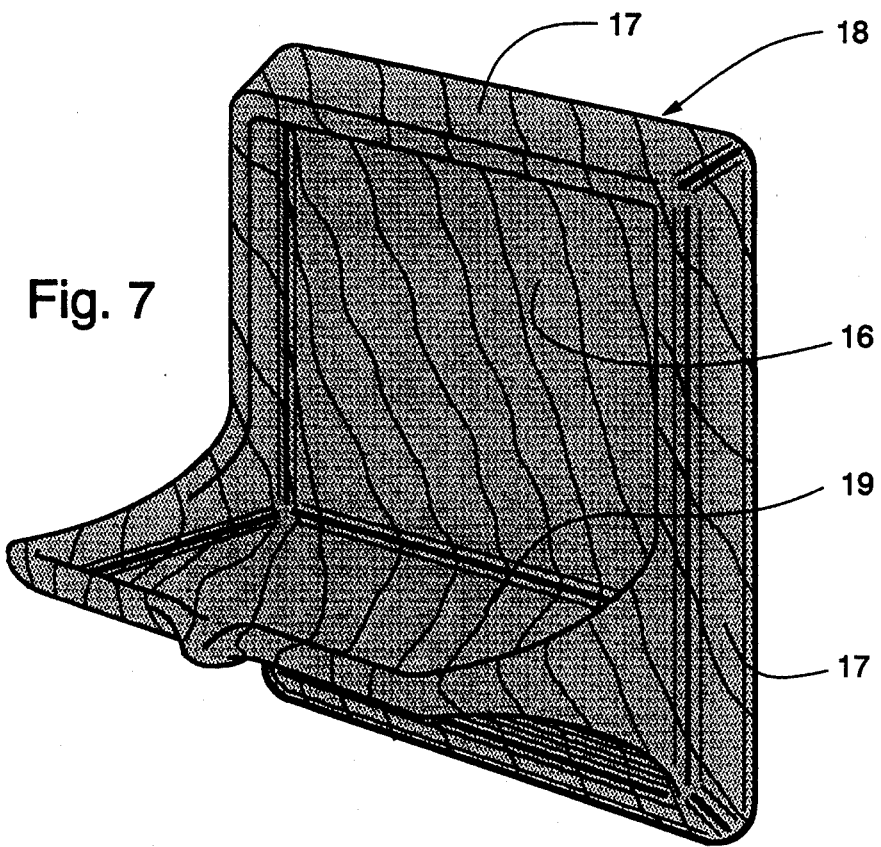
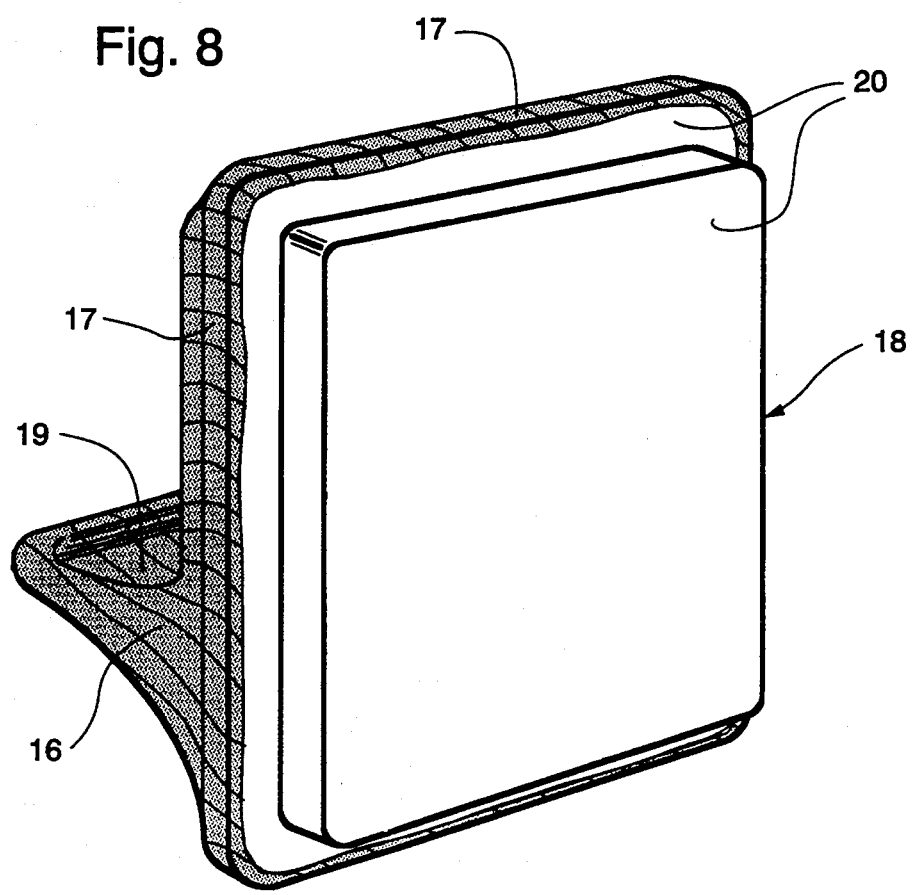

METHOD OF APPLYING A CERAMIC IMAGE TO A COMPLEX CERAMIC ARTICLE

This application is a continuation-in-part, of application Ser. No. 885,350, filed May 19, 1992, now abandoned.

FIELD OF THE INVENTION

This invention relates a method of decorating ceramic articles including tile, but particularly decorating complex ceramic articles such as trim shapes, towel bars and soap dishes.

BACKGROUND OF THE INVENTION

The placement of images on ceramic tile is commonly accomplished with decals, pad printing or screen printing. These decorating techniques tend to be limited to flat or less complex shapes in the case of decals, the image is commonly kept away from the edge of the tile because it is difficult to stretch a decal.

In the case of pad printing, a form must be made for each shape to provide a transfer. This may work for some basic shapes but the more complex the shape, the more difficult it is to decorate it. Also, each transferred image is exactly the same.

Screen printing can be used to put a design on ceramic tile but it only works for flat surfaces. This means that the beveled areas of the surface remain undecorated. All of the above processes do yield a 100% ceramic article but each has its limitation.

Japanese Patent Application S59-258802, filed by Dai Nippon Printing Co., Ltd. and Cubic Engineering Co., Ltd. on Dec. 5, 1984 and published Jun. 21, 1988 describes the use of the transfer process described in Nakanishi U.S. Pat. No. 4,010,057, Arai et al. U.S. Pat. No. 4,229,239 and Nakanishi U.S. Pat. No. 4,436,571, to print organic inks on all types of complex shapes. These U.S. patents are incorporated by reference.

The Japanese patent, application describes applying a thin coat of oil to the ceramic article prior to transferring the ceramic ink to the ceramic article. However, the japanese patent application clearly teaches firing the oiled ceramic article prior to transferring the ceramic ink. The present inventors have found that such a process in which the oil is burned off prior to printing, will adhere a ceramic ink to a ceramic article only if less than twenty percent of the surface area is printed. If the process is used to print greater than twenty percent of the surface area, the ink will tend to wash off during the rinsing step prior to firing of the printed article.

SUMMARY OF THE INVENTION

An object of the present invention is to provide a method to produce a complex shaped ceramic article which has been decorated with a ceramic ink to form a 100% ceramic product.

The present ceramic imaging technique makes it possible to put a 100% ceramic image on items such as ceramic tile trim sections, towel bar ends and soap dishes. Each of these images has a degree of individualism depending upon the original art work that can come from a variety of sources such as photographs and natural materials like marble, granite or wood. In addition, almost any image developed by an artist can be transferred to film and then used to image tile. The glazed finish will have the performance of typical ceramics but can be altered to provide the desired level of gloss.

A ceramic ink transfer process has been developed that permits the decoration of complex ceramic articles; that is articles having many curved, as well as flat, surfaces, which curves may have small radii of curvature. This process uses standard rotogravure printing techniques to place ceramic inks on a soluble film such as PVA (Poly vinyl alcohol) film.

The surface of the ceramic article or tile is carefully prepared to receive the image. To obtain adhesion during the transfer process, a glazed ceramic can be etched to achieve a matte surface or a matte tile can be used directly. A thin layer of oil is sprayed on the matte surface and dried, but not fired, to enable greater than 20% (preferably greater than 30%) coverage of the ceramic article surface.

The ceramic image on the film is then transferred to the tile or ceramic shape using the water flotation or transfer printing process of the prior art. After transfer, the residual PVA is carefully washed off of the tile while the printed image is held in place by the insoluble precoated oil.

In the decorated ceramic article of the present invention, the ceramic ink is applied to the sides and at least a portion of the backside of the article. Also concave and convex surfaces as well as edges having small radii of curvature can be decorated. There is no limit to the radius of curvature which can be decorated by the present process. The present process can decorate curves having a radius of curvature of less than 0.25 inch, even less than 0.10 inch and less than 0.05 inch.

The precoated oil and any other organics are burned off using temperatures up to about 425° C. The ceramic image is then fused into the tile by firing in a roller hearth or other type of kiln to approximately 775° C. The process is completed by firing on a glaze at about 1100°–1200° C. It is possible to skip the burn out step and possibly the fusion step and do the complete firing after the glaze has been applied.

The finished ceramic article has a 100% ceramic finish that is very durable. The image itself is very natural because of the way the image disperses in the water bath prior to the transfer. This controlled randomness makes each decorated article slightly different which increases the overall attractiveness of items made by this process, particularly if the design is intended to resemble natural designs such as wood grain or marble.

BRIEF DESCRIPTION OF THE DRAWINGS

FIG. 1 is a perspective view of the front or top and sides of a ceramic tile decorated by the present process.

FIG. 2 is a perspective view of the back or bottom and sides of a ceramic tile decorated by the present process.

FIG. 3 is a perspective view of the outside of a ceramic corner trim piece decorated by the present process.

FIG. 4 is a perspective view of the inside of a ceramic corner trim piece decorated by the present process.

FIG. 7 is a perspective view of the front and sides of a ceramic soap dish decorated by the present process.

FIG. 8 is a perspective view of the back and sides of a ceramic soap dish decorated by the present process.

DETAILED DESCRIPTION OF THE INVENTION

Figure 5:
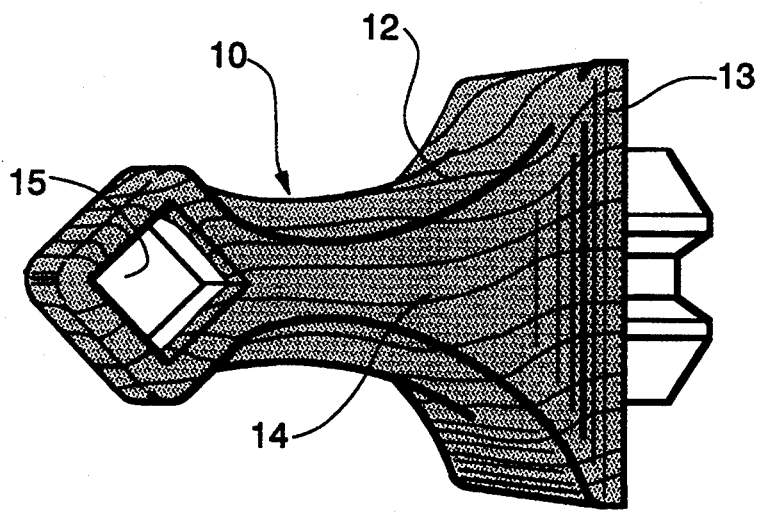
FIGS. 5 and 6 are perspective views of a ceramic towel bar end or holder decorated by the present process.

This transfer process for decorating ceramic articles differs from traditional practices because the image can be used to decorate three dimensional surfaces of ceramic articles with complicated patterns and images, covering greater than 20% of the surface area. Traditionally, flat ceramic tile are decorated by screen printing or decals to impart natural or stylish images. Because trim tile have edge radii and/or curvatures, screen printing cannot be used; hence, trim tile are plain or have the image applied only to the flat areas.

Referring to FIGS. 1 and 2, there is shown a typical ceramic tile 1 which has been decorated by the present process. Note that the ceramic ink 2 substantially completely covers the exposed front or top surface 3 and the sides 4. The ceramic ink also covers a portion of the back or bottom surface 5.

In FIGS. 3 and 4, a ceramic corner or trim tile 6 is shown. The convex exposed front surface 7, comprising three plane surfaces, and the edges 8, which connect the front surface 7 and back surface 9, are substantially completely covered by the ceramic ink 2. Also the concave back surface 9 is partially covered by the ink.

Figure 6:
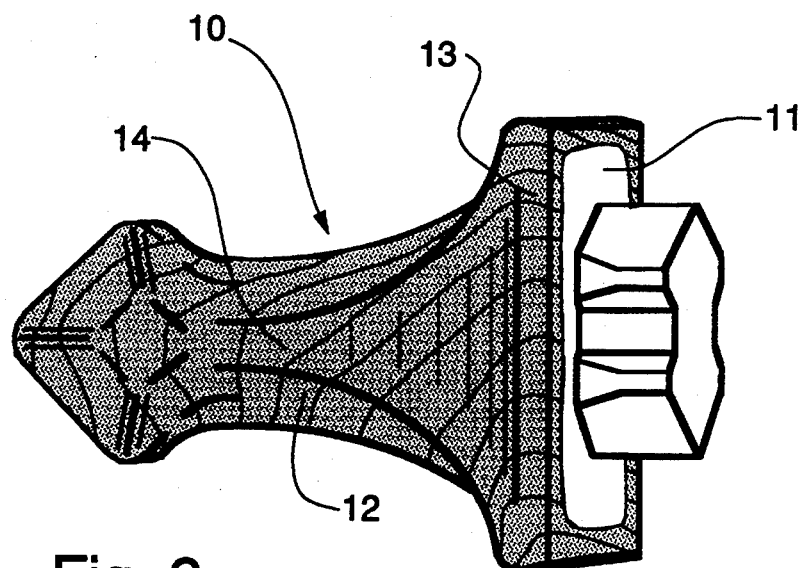

A towel bar end or holder 10 is shown in FIGS. 5 and 6. As in the preceding figures, the back surface 11 is partially covered with ink. However, the front surface 12, which is connected to the back surface 11 by edge surfaces 13, includes a raised surface 14. Not only is the convex portion of the front surface covered with ink, the concave surface 15 is also partially covered with ink.

In like manner, the front surface 16 and edge surfaces 17 of the ceramic soap dish 18, shown in FIGS. 7 and 8, are substantially completely covered by ceramic ink, including the depressed surface 19. Again, a portion of the back surface 20 is covered with ink.

The present decoration process involves the use of a glass powder or frit mixed with inorganic stains and an oil medium to form a ceramic ink or slurry. Solvent is added to achieve a viscosity of 100–1000 centipoise.

The frit used to date is designed to melt and fuse at approximately 775° C. and was purchased from Heraeus Inc. It is part of their H34000 series on glaze colors for porcelain. Other materials could be used with attention given to fusion profiles and thermal expansion characteristics appropriate for the article.

The oil medium, #203, was also purchased from Heraeus. The composition of the #203 oil is a trade secret. However, any organic matter which will essentially completely volatilize during the burnout step, for example pine oil, may be used.

Odorless mineral spirits made up the remaining portion of the ink primarily to reduce the viscosity. The resulting composition being:
 @40% frit/stains
 @30% printing medium
 @30% mineral spirits.

The frit is mostly composed of a glass designed to melt and fuse at a specified temperature. The stains or color makes up a small portion of the total frit formulation. Frit is commercially available.

The printing medium may be a conventional solvent-based silk screen printing oil. The frit is milled into the oil to disperse it and break up any aggregates of the glass powder. Preferably, the frit has a diameter of about 2 to about 32 microns.

While mineral spirits have been used to lower viscosity, those of ordinary skill in the art could substitute other solvents. The viscosity is preferably between about 100 and about 1,000 centipoise.

The ink was printed on a carrier film. The ink may be printed using standard techniques such as screen printing and rotogravure printing. Since adhesion is improved by use of a thin layer of oil on the ceramic article before transfer of the image to the article, the carrier film can be printed over greater than 20% (preferably greater than 30%) of its surface area. If the carrier film is printed with a screen printing process, a screen size of U.S. Mesh No. 200 or less can be used.

Poly vinyl alcohol film was used for preparing samples to date but any water soluble polymer film could be used. Further, the carrier film need not be soluble in water, but need only be soluble in whatever solution is used to float the film during the transfer process.

A glossy glazed ceramic article was prepared for image transfer by optionally etching the existing ceramic (glass) surface with a commercial glass etching paste or by using a matte glazed article directly. Preferably the surface of the ceramic article is glazed prior to transfer to avoid bubble formation during the transfer step. The surface of the article was sprayed with a primer formulation consisting of Heraeus #203 oil, Heraeus V167 thinner and acetone in the following proportions:
 @20% #203 oil
 @30% V167 thinner
 @50% acetone.

The primer was applied at approximately 0.01 to 0.02 grams dry weight #203 oil per square inch (0.0155 to 0.031 g/cm$^2$). The primer is preferably applied at about 0.0075 g/cm$^2$ to about 0.05 g/cm$^2$. A lower primer density can be used but then the ceramic ink may not adhere adequately. A higher primer density can be use but it may interfere with the quality of the image during the subsequent processing steps. The primer was allowed to dry before proceeding with transferring the image. Selection of the primer is important because it must provide the mechanism for the image to adhere and exhibit good burnout characteristics for subsequent process steps.

The image must be prepared in order for it to adhere to the primed tile surface. This was accomplished by casting a thin film of activating solution on the image side of the printed PVA film. A #6 wire wound rod was used for this purpose. The activating solution was a mixture of #203 oil and V167 thinner with the following proportions:
 @41% #203 oil
 @59% V167 thinner.

Also 100% V169 thinner was effectively used. After the activating solution was cast on the image, several slits were made to the perimeter of the PVA film. These slits were approximately ¾" long, perpendicular to the edge of the film and nominally every 1" on each edge. The slits keep the film from rolling up on itself when placed on the water surface. If a heavier coverage (greater surface area) of ink is to be transferred, it is desirable to increase the activation time.

The activated film was placed image-up on top of a water surface. The water soluble PVA began to absorb water, wrinkle, then flatten out as the water permeated the film. An air stream on the film surface deters the wrinkles from impinging on themselves. Once the image was flattened, the article was pushed into the image until it was completely submerged. The image wrapped around the article including rounded corners and edges.

The article can then be dried and processed later or taken immediately for removal of the PVA residue. A light water shower is necessary for this step. The PVA further solublizes and is rinsed away leaving the water-insoluble ceramic ink behind.

The article was dried at approximately 105° C. for about 1 hour to remove water from the rinsing step. While the time and temperature of the drying step can be varied, it is preferred that the drying time be within about 45 and 75 minutes and the temperature be near 100° C.

At this point, the article can be processed a number of different ways. A clear glaze was applied after the burn-out stage or after the image fusion stage. Lab samples have gone through a burnout step and a fusion step to remove all organic materials and melt the frit respectively. Two burnout schedules have been used.

The first was a two hour ramp from the drying temperature of 105° C. to 454° C. followed by a 2 hour soak at 454° C. Preferably the burnout is conducted using a two hour plus or minus 15 minute ramp to a temperature of between 400° C. to 700° C. and a two hour plus or minus 15 minute soak.

The second burnout schedule was 5 minutes at 200° C., 10 minutes at 300° C., 10 minutes at 400° C., and 5 minutes at 500° C. Preferably the about times at temperature are plus or minus 3 minutes and the temperatures are plus or minus 100° C. except the last temperature which is between 400° C. and 500° C.

The image and clear glaze were then fired (fused) together. Again two firing or fusion schedules have been used.

The first was 36 minute total, fusion entry to exit (preferably 20 minutes to 90 minutes). The first schedule was 2.5 minutes entry, 2 minutes at 350° C. (preferably 200° C. to 500° C.), 4 minutes at 500° C. (preferably 400° C. to 600° C.), 4 minutes at 650° C. (preferably 500° C. to 725° C.), 2 minutes at 775° C. (preferably 600° C. to 875° C.), and 19 minute cooldown.

The second fusion schedule was a 30 minute total, fusion entry to exit (preferably 20 minutes to 90 minutes). The second schedule was 2.5 minute furnace entry, 10 minutes at 775° C. (preferably 5 minutes to 15 minutes at 675° C. to 875° C.), 15 minute cooldown (preferably 8 minutes to 22 minutes), and 2.5 minute furnace exit.

It is conceivable that a clear glaze could be applied over the article after the rinsing step. A combined burnout/fusion step could then be used to remove the organic material and melt or fuse the image and glaze in the process. Such a combined step could include a 60 minute entry to exit with peak temperature appropriate for the ceramic article and glaze, currently about 1060° C. maximum temperature, (preferably 1000° C. to 1200° C.). Dwell times could be established by those of ordinary skill in the art.

Other burnout/fusion schedules could be designed by those of ordinary skill in the art depending on the type of furnace used, for example roller hearth or cart type kilns. Variations in temperature and times can be tolerated as long as all organic matter is removed before the fusion step and the ceramic glaze (image and clear overcoat) is fused properly.

The time and temperature is also affected by the temperature at which the glaze fuses. Fast fire glazes in a roller type kiln can be processed in about 1 hour. Slower melting glazes in cart type kilns require several hours.

EXAMPLE 1

Ceramic shapes including 4½ inch by 4½ inch glazed ceramic tile were prepared by cleaning off any residuals with acetone. The tile surface was etched by spreading an overall layer of Armour Etch etching cream, a mineral acid solution, on the surface of the ceramic tile. The etching cream remained on the surface of the tile 5 to 10 minutes. The etching cream was then removed with running tap water and the tile was allowed to completely dry.

The tile was then sprayed with 0.1 to 0.6 grams of the primer formulation describe above to form a thin layer. The viscosity of the primer was 20 to 100 centipoise. The ceramic tile was then allowed to dry before proceeding.

A poly vinyl alcohol (PVA) film, 0.0014 inch (0.04 mm) in thickness, which was previously rotogravure printed with a ceramic ink was laid flat with the ink surface exposed. Then a #6 stainless steel wire wound cylindrical drawdown bar was placed on top of the film edge at one end of the film. A bead of the primer formulation was applied in front of the bar. Then holding the bar down firmly against the PVA film, the film was slowly and evenly pulled underneath the bar. This procedure applied the primer oil medium evenly to the complete surface of the film.

The film was then laid flat and small slits (¼" to ½" in length) were cut into the film on all four sides at about 1" intervals using a single edged razor blade. The slits deter the film edges from curling up in the water.

The film was then placed on the surface of tap water (about 75° F. to about 85° F.) with which a tank has been filled. Care must be taken to be sure that the film is not submerged in the water. After approximately 15 seconds, the film began to wrinkle. By blowing gently onto the film in the wrinkled area, the wrinkles were dissipated, leaving a flat level design.

When the film edge does not wrinkle at the touch, the film is ready to be transferred. The tile was submerged into the film covered water at a 45° angle until the film image was adhered to the front and edge surfaces of the tile. The film image also adhered to a portion of the back surface. The ink remaining on the surface of the water was pushed aside so that the tile could be removed from the water cleanly without overlapping.

The tile was then allowed to dry. The PVA film binder remaining on the tile was washed off using a spray gun (5 to 30 psi, preferably 10 to 15 psi) and tap water.

The ceramic tile was then put into an oven at 200° F. (93° C.) for 2 to 4 hours until completely dry. When dry, the tile was put into an oven for up to 24 hours at about 800° F. (about 425° C.) to burn off the remaining residuals such as oils and solvents.

Then the tile was put into a four stage infrared furnace to melt (fuse) the ceramic ink (glass) onto the surfaces to which it adhered during the transfer process. The belt speed was set at 5"/min and a temperature of 775° C. so that the tile was exposed to the temperature for about 12 minutes. The final step was to glaze and fire the tile in a kiln at approximately 1100° C. to 1200° C.

EXAMPLE 2

The process was the same as Example 1, except matte glazed ceramic shapes were used. Therefore, the etching step of Example 1 was unnecessary. However, the process of Example 2 cannot be used with bisque or unsealed ceramic shapes due to their porosity. The ceramic surface in all instances must be clean and clear of any residuals before the start of the transfer process.

What is claimed is:

1. A method of printing a ceramic article with a ceramic ink comprising:
   (a) applying an oil to the surface of the article,
   (b) printing a ceramic ink on a soluble carrier film,
   (c) activating the ink by applying a solvent thereto,
   (d) floating the activated ink and carrier film on a solvent, and
   (e) submerging at least a part of the oiled article through the floating ink and into the solvent, the article not being fired between the time the oil is applied to it and the time it is submerged through the floating ink and into the solvent.

2. The method of claim 1, wherein at least 20% of the surface of the article is printed with ceramic ink.

3. The method of claim 1, wherein at least 30% of the surface of the article is printed with ceramic ink.

4. The method of claim 1, wherein at least 20% of the soluble carrier film is printed with ceramic ink.

5. The method of claim 1, wherein at least 30% of the soluble carrier film is printed with ceramic ink.

6. The method of claim 1, wherein the ceramic ink is printed on the soluble carrier film using a rotogravure printing process.

7. The method of claim 1, wherein the ceramic ink is printed on the soluble carrier film using a printing screen which is no greater than U.S. No. 200 mesh.

8. The method of claim 1, wherein the oil is applied to article between about 0.0075 $g/cm^2$ to about 0.05 $g/cm^2$.

9. The method of claim 8, wherein the oil is applied to article between about 0.0155 $g/cm^2$ to about 0.031 $g/cm^2$.

* * * * *